June 7, 1938. A. SETZER 2,119,967
ELECTRIC STORAGE BATTERY
Filed July 31, 1935

Inventor:
Albert Setzer
By
Attorneys.

Patented June 7, 1938

2,119,967

UNITED STATES PATENT OFFICE 2,119,967

ELECTRIC STORAGE BATTERY

Albert Setzer, North Scituate, R. I.

Application July 31, 1935, Serial No. 34,043

7 Claims. (Cl. 136—168)

The present invention relates to electric storage batteries and more particularly to improvements in the binding-posts therefor to render them less liable to be mutilated or otherwise injured by frequent disconnection and reconnection of the cables.

One of the objects of the present invention is to provide a binding-post of relatively hard durable material for electric storage batteries having means for clamping a cable-conductor thereto.

Another object of the invention is to provide interlocking means between the binding-post and casing of the battery to prevent twisting of the post with respect to the casing.

Another object of the invention is to provide in an electric storage battery removable sealing means between the binding-post and the battery casing which may be adjusted and locked to effect a permanent and positively leak-proof joint.

Another object of the invention is to provide a binding-post of the type indicated which is of relatively simple and compact structure, lending to economical manufacture and assembly and one which performs its intended function over long periods of use without necessitating repair or replacement.

Further objects of the improvement are set forth in the following specification which describes a preferred embodiment of the invention, by way of example, as illustrated by the accompanying drawing. In the drawing.

Figures 1, 2, 3, 4, 5:
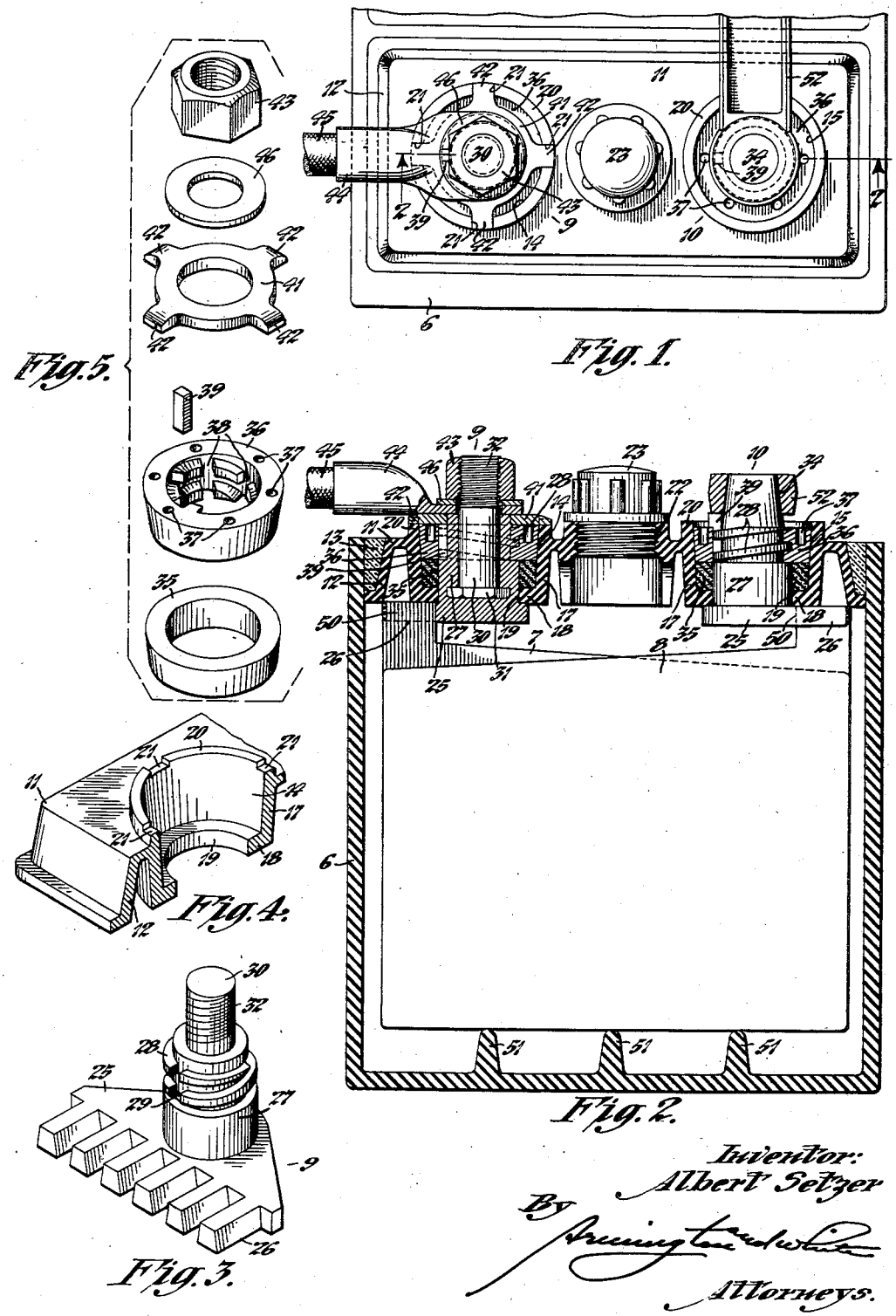
Fig. 1 is a top plan view of a battery-cell showing the improved terminal binding-post with a cable-conductor attached thereto.
Fig. 2 is a longitudinal sectional view of the same taken on line 2—2 of Fig. 1 and showing the structure and relationship of the parts forming the terminal-element of the cell.
Fig. 3 is a detailed perspective view of the improved terminal-element of the cell.
Fig. 4 is a detailed perspective view of a section of the cover for the cell showing the recess in which the binding-post is seated.
Fig. 5 is a composite perspective view of the parts which cooperate with the binding-post and recessed cover to attach a cable-conductor to the post and form a sealed leak-proof joint.

Electric storage batteries have heretofore usually been provided with lead terminals or binding-posts of tapered or generally frusto-conical shape which project above the cover of the casing. The cables are attached to the posts by split connectors which are clamped tightly about the posts by bolts extending through lugs at the sides of the connectors. Such clamps are inconvenient to attach to and remove from the post because of their form and shape and when a clamp is attached and removed frequently the binding-post becomes mutilated and deformed due to the plasticity of the lead. Further, because of the twisting and bending strain exerted on the posts the seal between the post and casing is apt to be ruptured to form an open seam through which the electrolyte may leak.

The improved binding-post of the present invention is particularly adapted for use with batteries that are frequently recharged as, for example, those used in taxicabs, trucks and busses, whereby to overcome the deficiencies of batteries heretofore used for such purposes. With the present improved binding-post the cable-connector may be easily and quickly attached thereto or detached therefrom and such connections may be made repeatedly without mutilating the post or breaking the seal. The improved device of the present invention consists generally in a composite pillar-strap of lead and a binding-post of harder metal such as steel or brass embedded in the pillar-strap. The extended end of the post is preferably threaded to receive a clamping nut for cooperation with a flat seat formed by a radial flange or fixed washer on the post. Means are provided on the flange or washer for cooperation with the casing-cover to lock the post against twisting movement in the casing and to prevent such strain being transmitted to the parts of the terminal-element below the flange. Sealing means such as disclosed in my prior U. S. Letters Patent No. 1,505,219 of August 19, 1924, are also provided for effecting a permanent leak-proof joint between the binding-post and the casing-cover.

The improved form of terminal binding-post is adapted for use with practically all types of storage batteries and in Figs. 1 and 2 a conventional type of battery-cell is illustrated as enclosed within the usual hard rubber jar 6. Arranged in spaced relationship within the jar 6 are the battery electrodes comprising the usual plates or grids 7 and 8 of opposite polarity which are united, respectively, with the pillar straps of a pair of terminal-elements 9 and 10. The terminal-element 9 which comprises the present improved binding-post is of novel construction, as will later be more fully explained, while the element 10, adapted for connection with a corresponding element in the adjacent cell, is of the same construction as illustrated and described in my prior patent hereinbefore referred to. The jar 6 is adapted to contain an electrolyte in which the plates are immersed and is closed at the top by a cover 11.

The cover 11 corresponds to the cover disclosed in my prior patent and is therefore only briefly described herein. Suffice it to state that the cover is preferably molded of hard rubber or similar dielectric and acid-proof material with relatively thin walls which are ribbed or recessed to provide the required strength and stiffness. As illustrated in Figs. 2 and 4, the cover 11 has a depending marginal flange 12 offset at the bottom to form a trough within the interior walls of the jar 6 and a sealing compound 13 is poured into the space between the walls and the flange to form a sealed joint. As shown most clearly in Fig. 2, the cover 11 is provided with circular recesses 14 and 15 through which the posts of the terminal-elements 9 and 10 are adapted to project; each recess being formed by a frusto-conical cup-like depression 17 having an inwardly-directed flange 18 at the bottom defining a circular aperture or opening 19. Circular ribs 20 project from the top surface of the cover 11 around the recesses 14 and 15, and the rib surrounding the recess 14 has a plurality of notches or slots 21 formed on its upper edge. Between the recesses 14 and 15 the cover is apertured at 22 to provide a filling opening which is adapted to be closed by the usual vent-plug 23.

The terminal-element 9, shown in detail in Fig. 3, comprises the usual lead pillar-strap 25 having a comb 26 projecting at one side, for connection with a series of the electrode-plates of the same polarity, and an integral boss 27 which projects upwardly from the flat face of the pillar-strap. The boss 27 is adapted to extend through the opening 19 into the recess 14 formed in the cover 11 with its upper end projecting above the top of the rib 20. The upper portion of the boss 27 is formed on its periphery with square threads 28 interrupted by vertical slots 29 cut therethrough. The boss 27 has an axial bore in which is secured a stud 30, preferably constructed of steel or brass coated with lead or the like to increase its conductivity. As illustrated in Fig. 2, the stud 30 has a flat head 31 at its lower end and a shank which extends axially of the boss 27 with its projecting end threaded at 32. The stud 30 is embedded in the boss 27 by molding the material of the terminal-element 9 about its shank and head.

The terminal-element 10 comprises a pillar-strap 25 and a projecting boss 27 having a portion thereof formed with square threads 28 interrupted by slots 29, as with the boss 27 on the element 9. The boss 27 of this terminal-element 10 is adapted to extend through the opening 19 and into the recess 15 in a manner similar to the boss 27, but instead of being provided with a stud for a binding-post its end is tapered at 34 to adapt it to receive a connector 52 to be later described.

The joint between each of the terminal-elements 9 and 10 and the cover 11 is sealed in the manner illustrated and described in my prior patent before referred to. This sealing means comprises compressible ring-gaskets 35 seated in the recesses 14 and 15 surrounding the bosses 27 on the elements 9 and 10. The gaskets 35, preferably formed of soft rubber, are compressed in the recesses by nuts 36 in engagement with the threads 28 on the bosses 27. The upper face of the nuts 36 are provided with holes 37 or other suitable means for engagement by a spanner wrench to screw the nuts onto the bosses 27. As the nuts 36 are screwed down on the threaded portions of the bosses 27 the gaskets 35 are compressed between the bosses 27 of the elements 9 and 10 and the side walls of the recesses 14 and 15 to seal the joints. The application of the nuts to the bosses 27 causes the flanges 18 of the cover to be firmly seated against the pillar-straps 25 of the terminal-elements 9 and 10; it being understood that the joint-sealing means is adjusted before the compound 13 is poured to seal the cover to the jar. As the gaskets 35 are compressed to seal the joints the slots 29 extending through the threads 28 on the bosses 27 will register with correspondingly-shaped slots 38 cut across the threads of the nuts 36, and keys 39 are then slid into the alined slots to lock the nuts in adjusted position on the bosses 27. The joints thus formed are made positively leak-proof under all conditions of use of the battery.

A flat washer 41 of hard lead or lead-coated steel or brass, see Fig. 5, is placed on the upper reduced end of the boss 27 above the threads 28. The washer 41 may be coated with cadmium or lead and burned, sweated or otherwise rigidly secured to the boss 27. The washer 41 is of generally circular contour to adapt it to lie within the circular rib 20 and is formed with projecting lugs or prongs 42 for engagement with the notches 21 in the top of the rib. The washer 41 thus forms an annular flat seat below the threaded end 32 of the stud 30 with the lugs 42 interlocked with the rib 20 to positively prevent twisting of the terminal-element 9 with respect to the casing. Further, the locking engagement between the washer 41 and rib 20 resists any twisting strain applied on the threaded end 32 of the stud 30 to prevent the strain being transmitted to the boss 27. A nut 43, preferably lead-coated, is applied to the threaded end of the stud 30 to clamp the cable-connector 44 against the annular seat formed by the washer 41. The cable-connector 44 may be of any suitable construction and, as herein shown, is comprised of a relatively flat annulus having a hollow cylindrical projection at its side within which the cable 45 is soldered or otherwise secured. A washer 46 is preferably placed between the nut 43 and cable-connector 44 to resist any tendency of the connector to unscrew the nut.

In assembling the battery the alternate plates 7 and 8 are first united with the respective terminal-elements 9 and 10 in the usual manner by burning the projecting lugs 50 on the plates to the teeth of the combs 26. The assembly of plates and terminal-elements, including suitable separators between the plates, is then inserted in the jar 6 with the lower edges of the plates resting on ribs 51 or the like to hold them spaced from the bottom of the jar. The cover 11 is applied to the jar 6 with the bosses 27 on the terminal-elements 9 and 10 projecting upwardly through the apertures 19 and into the recesses 14 and 15 in the cover. The cover 11 is pressed down until the flanges 18 surrounding the apertures 19 engage the pillar-straps 25 around the bosses 27. The compressible ring-gaskets 35 are then inserted into the recesses 14 and 15 surrounding the bosses 27 and the nuts 36 screwed down on the threads 28 to compress the gaskets and seal the joints between the terminal-elements 9 and 10 and the cover 11. When the gaskets 35 have been sufficiently compressed the keys 39 are inserted through the alined slots 29 and 38 on the bosses 27 and in the nuts 36 to lock the parts in adjusted position. The washers 41 are applied to the upper ends of the bosses 27 in the position shown in Fig. 2 with their lugs 42 seated in the notches 21 on the ribs 20; the washers being then burned or sweated to the bosses. The washers 41 are thus fixedly united with the bosses 27 to form an integral structure with the elements 9 and 10 so that the interlocking engagement of the lugs 42 with the notches 21 in the cover 11 positively lock the terminal-elements from twisting.

The cover 11 may then be secured to the casing 6 by pouring the sealing compound 13 into the trough-like space between the depending flange 12 and contiguous inner faces of the walls of the jar 6 to form an assembled cell. It will be understood that a series of the cells are usually arranged in tandem with each end-cell having one of the present improved terminal-elements 9 to provide binding-posts of opposite polarity; while the other terminal-elements 10 are joined to each other in adjacent cells by connector-straps 52 burned onto the tapered ends 34 of the posts 27. The cable-connector 44 may be quickly applied over the threaded end of the stud 30 and clamped between the annular flat face of the washer 41 and the washer 46 by screwing on the nut 43. The cable-connector 44 may likewise be quickly detached from the binding-post by merely backing off the nut 43 and removing the connector over the end of the stud 30.

It will be observed from the foregoing description that the present invention provides an improved terminal-element for storage batteries having a practically indestructable binding-post for the cable-conductor which will not be mutilated or otherwise injured by frequent attachment and detachment of the cable-connector. It will further be observed that the improved form of terminal-element also resists twisting or skewing and rupture of its connections while also providing for tightly sealing the joint between the post and cell-cover to prevent leakage of the electrolyte.

Still further, it will be observed that the improved form of terminal-element is of comparatively simple construction adapted to be easily assembled and disassembled and comprising only a few parts which lend to economical manufacture.

While I have herein shown and described a preferred form of construction of the device, it is to be understood that various modifications may be made in the structure and arrangement of its parts without departing from the spirit or scope of the invention. Therefore, without limiting myself in this respect, I claim:

1. In a storage battery cell, the combination of a casing, electrode-plates in the casing, a cover for the casing provided with a recess having a centrally-positioned opening therein, a pillar-strap for connecting a series of the electrode-plates and having a boss projecting upwardly through the opening and into the recess in the cover, a compressible gasket surrounding the boss, means cooperating with the boss for compressing the gasket to seal the joint between the boss and the cover, a washer swetted to the boss as an integral part thereof and forming a flat seat above the gasket, a screw-threaded stud extending upwardly from the boss and washer, and a nut on the screw-threaded stud for clamping a detachable connector against the flat seat formed by the washer.

2. In a storage battery cell, the combination of a casing, electrode-plates in the casing, a cover for the casing provided with a recess having a centrally-positioned opening therein, a pillar-strap for connecting a series of the electrode-plates and having a boss projecting upwardly through the opening into the recess in the cover, a compressible gasket surrounding the boss, a nut cooperating with the boss for compressing the gasket to seal the joint between the boss and the cover, a polygonal headed stud embedded in the pillar-strap and extending axially of the boss, said stud having a screw-threaded end projecting beyond the end of the boss, a washer swetted to the upper end of the boss as an integral part thereof and forming an annular seat, interlocking means on the washer and cover to prevent the boss from twisting in the casing, and a nut on the threaded end of the stud for clamping a detachable connector against the annular seat formed by the washer.

3. In a storage battery cell, the combination of a casing, electrode-plates in the casing, a cover for the casing provided with a conical recess having a centrally-positioned opening therein, a notched rib on the cover surrounding the recess, a terminal-member for connecting a series of the electrodes and having a boss extending through the opening and into the recess in the cover, a stud embedded in the terminal-member axially of the boss and having a threaded end projecting beyond the end of the boss, a compressible gasket surrounding the boss, means cooperating with the boss for compressing the gasket to form a liquid-tight seal between the casing on the boss, a washer swetted to the upper end of the boss as an integral part thereof and forming a flat seat at the bottom of the screw-threaded end of the stud, peripheral lugs on the washer for cooperation with the notched rib on the cover to prevent the boss from twisting in the cover, and a nut on the threaded end of the stud for clamping a detachable connector against the flat seat formed by the washer.

4. In a battery cell, the combination of a cover provided with a recess having a centrally-positioned opening therein, a terminal-member comprising a post projecting upwardly through the opening and into the recess in the cover, said post having external screw-threads thereon, a stud embedded in the post and having a screw-threaded end projecting beyond the post, a compressible gasket surrounding the post, a nut cooperating with the screw-threads on the post for compressing the gasket to seal the joint between the post and the cover, a washer swetted to the post as an integral part thereof to form an annular seat, and a nut on the screw-threaded end of the stud for clamping a detachable connector against the annular seat.

5. In a storage battery cell, the combination of a casing, electrodes in the casing, a cover for the casing provided with a recess having a centrally-positioned opening, a notched rib on the cover surrounding the recess, a terminal-element for connecting a series of the plates, a boss on the terminal-element extending through the opening and into the recess in the cover, a compressible gasket within the recess surrounding the boss, an interiorly-threaded nut screwed down on the boss to compress the gasket to seal the joint between the boss and cover, means for locking the nut in adjusted position on the boss, a stud embedded in the terminal-element centrally of the boss and having a threaded end projecting beyond the boss, a washer swetted to the boss as an integral part thereof and forming an annular seat below the threaded end of the stud, said washer having lugs in locking engagement with the notches in the rib on the cover to prevent twisting of the post with respect to the cover and a nut on the threaded end of the stud for clamping a detachable connector against the annular seat.

6. A terminal-element for an electric storage battery comprising a pillar-strap, a stud embedded in the pillar-strap and having a screw-threaded end, a washer swetted to the stud as an integral part thereof and forming an annular seat, said washer having radially-extending locking lugs on its peripheral edge, and a nut on the threaded end of the stud for clamping a detachable connector against the annular seat.

7. A terminal-element for an electric storage battery comprising a pillar-strap, a cylindrical boss projecting from the strap, screw-threads formed on the exterior of the boss, a stud embedded in the pillar-strap and boss and having a threaded end projecting beyond the end of the boss, a washer swetted to the boss as an integral part thereof at the juncture of the boss and stud, said washer extending radially to form a seat, and a nut on the threaded end of the stud for clamping a detachable connector against the seat.

ALBERT SETZER.